United States Patent [19]
Foulkes

[11] Patent Number: 5,868,986
[45] Date of Patent: Feb. 9, 1999

[54] METHOD OF IN-MOLD LABELING

[75] Inventor: Jonathan Paul Foulkes, Bristol, England

[73] Assignee: Courtaulds Films (Holdings) Limited, England

[21] Appl. No.: 926,429

[22] Filed: Sep. 10, 1997

Related U.S. Application Data

[63] Continuation of Ser. No. 466,183, Jun. 6, 1995, abandoned, which is a continuation of Ser. No. 227,377, Apr. 14, 1994, abandoned, which is a continuation of Ser. No. 984,557, Dec. 2, 1992, abandoned.

[30] Foreign Application Priority Data

Dec. 7, 1919 [GB] United Kingdom ................. 91260547

[51] Int. Cl.⁶ ............................. B29C 45/14; B29C 39/10
[52] U.S. Cl. .......................... 264/259; 264/266; 264/483
[58] Field of Search ..................... 264/259, 266, 264/262, 268, 509, 510, 513, 516; 428/315.9, 316.6, 317.3, 317.9, 318.6, 349, 354, 910, 304.4, 515, 307.3, 308.4

[56] References Cited

U.S. PATENT DOCUMENTS

| | | | |
|---|---|---|---|
| 4,495,125 | 1/1985 | Hatakeyama et al. | 264/266 |
| 4,622,191 | 11/1986 | Takeuchi | 264/266 |
| 4,639,341 | 1/1987 | Hanamoto et al. | 264/509 |
| 4,710,338 | 12/1987 | Bagnall et al. | 264/509 |
| 4,780,364 | 10/1988 | Wade et al. | 428/315.5 |
| 4,898,706 | 2/1990 | Yabe et al. | 264/266 |
| 4,904,324 | 2/1990 | Heider | 264/509 |
| 4,942,008 | 7/1990 | Cahill | 264/266 |
| 4,986,866 | 1/1991 | Ohba et al. | 264/509 |
| 5,009,821 | 4/1991 | Weaver | 264/266 |
| 5,043,130 | 8/1991 | Fujio | 264/509 |
| 5,091,236 | 2/1992 | Keller et al. | 428/213 |
| 5,122,320 | 6/1992 | Masui et al. | 264/266 |
| 5,151,317 | 9/1992 | Bothe | 428/216 |
| 5,154,872 | 10/1992 | Masui et al. | 264/266 |
| 5,223,201 | 6/1993 | Masui et al. | 264/266 |
| 5,223,315 | 6/1993 | Katsura et al. | 264/509 |
| 5,227,222 | 7/1993 | Ogawa et al. | 264/266 |
| 5,254,302 | 10/1993 | Yamanaka | 264/509 |
| 5,292,465 | 3/1994 | Kobayishi et al. | 264/266 |
| 5,318,739 | 6/1994 | Katagiri et al. | 264/266 |

FOREIGN PATENT DOCUMENTS

| | | | |
|---|---|---|---|
| 2525143 | 10/1983 | France | 264/266 |
| 2841826 | 6/1979 | Germany | 264/266 |
| 55-15888 | 2/1980 | Japan | 264/266 |
| 56-5747 | 1/1981 | Japan | 264/266 |

*Primary Examiner*—Angela Ortiz
*Attorney, Agent, or Firm*—Bacon & Thomas

[57] ABSTRACT

Biaxially oriented polymeric films consisting of a core layer of pigmented, non-voided propylene homopolymer with a layer of voided propylene homopolymer on one surface of the core layer and a printable layer, for example of a polymer containing units derived from at least two of propylene, ethylene and but-1-ene, on the other surface of the core layer. Films of the present invention have been successfully used for in-mold labelling without the production of a leathery effect as has been observed with prior art films for in-mold labelling.

16 Claims, No Drawings

METHOD OF IN-MOLD LABELING

This application is a continuation of pending application Ser. No. 08/466,183 filed Jun. 6, 1995, now abandoned, which is a continuation of application Ser. No. 08/227,377 filed Apr. 14, 1994, now abandoned, which is a continuation of application Ser. No. 07/984,557, filed Dec. 2, 1992, now abandoned.

BACKGROUND OF THE INVENTION

This invention concerns polymeric films and in particular films for forming labels for in-mold labelling.

In-mold labelling is a technique in which a pre-formed polymeric label is incorporated into a polymeric article by molding the article in a mold containing the label. This technique in general provides labelled articles having a good appearance with the advantage that the labels effectively become an integral part of the articles and are thereby difficult if not impossible to remove. However, the molding process in general involves the use of high temperatures to effect melting or softening of the polymer used to form the articles, and since the pre-formed labels are usually made from polymeric films which have been stretched in their production, the temperatures to which the labels are subjected during the molding process usually lead to their shrinkage.

Although the dimensional changes resulting from label shrinkage can often be tolerated, and indeed anticipated when the labels are produced, shrinkage can lead to the films acquiring an undesirable appearance. In particular, it has been found that labels made from polypropylene films having a voided or cavitated layer resulting from the presence of a voiding agent such as chalk acquire a non-uniform or leathery appearance when they shrink. This is particularly disadvantageous as bonding of the molded polymer to the labels is usually improved significantly if the surface of the label which contacts the polymer being molded is voided or cavitated. Furthermore, voided or cavitated films are often preferred for forming labels as they are usually opaque and provide good contrast for printed indicia on the labels.

SUMMARY OF THE INVENTION

According to the present invention there is provided a biaxially oriented polymeric film comprising a core layer o r pigmented, non-voided propylene homopolymer with a layer of voided propylene homopolymer on one surface of the core layer and a printable layer on the other surface of the core layer.

Films according to the present invention have been used to make labels which have been subjected to in-mold labelling techniques without producing the leathery effect referred to hereinbefore.

DESCRIPTION OF THE PREFERRED EMBODIMENTS

It is generally preferred that the voided layer should represent a relatively minor proportion of the total thickness of the films so that any unevenness in the voided layer following shrinkage of the film during in-mold labelling has little or no effect on the film as a whole. Typically the voided layer will represent up to 20 percent of the total film thickness, but it can form less than 15 percent or even less than 8 percent of the total film thickness. In general, however, the voided layer should be sufficiently thick that as a result of in-mold labelling, satisfactory adhesion to the rest of the molded article is achieved.

In addition to the thickness of the voided layer, which will usually be from 2 to 10 microns thick, the degree of voiding can affect the properties of the films in in-mold labelling. As will be appreciated by those in the art, the degree of voiding of polypropylene by a voiding agent will depend on the particular voiding agent used and the amount of such agent which is used. The particle size of the voiding agent will usually be in the range of from 1 to 15 microns and preferably from 3 to 5 microns.

The voiding agent can be organic, for example a polyamide (eg a nylon) or a polyester (eg polyethylene terephthalate or polybutylene terephthalate), or inorganic, for example chalk. Chalk is particularly preferred as the voiding agent, the chalk content of the voided layer preferably being up to 5 percent by weight of the layer. The amount of voiding agent in the voided layer will, however, usually be at least 2.5 percent by weight of the layer and it can be up to 15 percent by weight of the layer. Preferred amounts of voiding agent are in the range of from 5 to 10 percent by weight of the layer. Insufficient voiding agent can lead to poor bonding of labels to the molded articles following in-mold labelling, whereas excessive amounts of voiding agent can lead to the labels acquiring a leathery effect following in-mold labelling.

The voided layer can also contain one or more adhesion promoters which serve to increase adhesion between the voided layer and the polymer to which the label is to be bonded in the in-mold labelling process. Examples of adhesion promoters include polymers containing units derived from propylene and at least one of ethylene and but-1-ene, and blends thereof. As will be appreciated, excessive amounts of adhesion promoter can lead to a reduction in voiding.

The core layer of pigmented polypropylene should not be voided or, if it is voided, it should only be voided to a sufficiently small degree that a leathery appearance does not result when in-mold labelling is effected using such films. Any of the wide variety of pigments can be used in the core layer, but they should be of a particle size such that at most minimal voiding results when the films are biaxially oriented. Typically the pigment should have a mean particle size of less than 1 micron, for example about 0.2 micron or less. Examples of pigments which can be used in the core layer include titanium dioxide, barium sulfate, zinc sulfide, calcium carbonate, mica or talc.

The amount of pigment in the core layer will usually be up to 20 percent by weight of the layer, and preferably from 7.5 to 15 percent by weight of the layer.

The printable layer is preferably a layer of a copolymer containing units derived from at least two of propylene, ethylene and but-1-ene, although other printable layers can be used. It is particularly preferred to use a printable layer which can be formed by co-extrusion of the layer with the core layer and the layer which becomes voided following biaxial orientation. A particularly preferred printable layer consists of a copolymer of propylene containing a minor amount of units derived from ethylene.

The printable layer can contain one or more pigments, for example as hereinbefore described for the core layer. The printable layer can alternatively be provided by a suitable coating composition, for example by a coating of an acrylic polymer.

If desired, the printable layer can be subjected to a treatment which increases the surface energy of the printable layer, for example using flame or corona discharge treatment.

Films of the present invention can be of various thicknesses, typically from 30 to 100 microns, for example from 50 to 70 microns. The core layer will usually have a thickness of from 45 to 65 microns, it generally being preferred that the voided layer has a thickness of about 5 microns. The printable layer when present as a co-extruded layer on the core layer will typically be about 1.5 microns thick.

As will be appreciated, when films in accordance with the present invention are used to effect in-mold labelling, the voided layer should contact the molding polymer with the printable layer being exposed following the molding technique. The in-mold labelling can be effected by known methods, for example by injection molding of polymer into a mold containing the label, or more preferably by thermoforming a polymer, for example in the form of a sheet, into a mold.

Films in accordance with the present invention can be prepared using known methods. For example, the three layers can be co-extruded to form a web which is then biaxially oriented, either simultaneously using the bubble process or preferably sequentially, eg using heated rollers to stretch the web longitudinally and then a stenter oven to stretch the web in the transverse direction. Although the printable layer is preferably formed by co-extrusion, it can be formed by other methods, for example it can be formed by applying a suitable coating to the core layer either after biaxial stretching or between stretching in the longitudinal and transverse directions. The following Example is given by way of illustration only.

EXAMPLE

A flat three-layer polymer web was produced by co-extruding a core layer of propylene homopolymer containing 10 percent by weight of titanium dioxide of average particle size of about 0.2 microns with a layer of propylene homopolymer containing 5 percent by weight of chalk having an average particle size of 3.5 microns on one side and a layer of a propylene/ethylene (4 percent by weight of units derived from ethylene) on the other.

The three-layer web was then stretched 4.5 times in the direction of extrusion using heater rollers at 120° C., and thereafter it was stretched 10 times in the transverse direction in a stenter oven at 156° C. The copolymer layer was then subjected to corona discharge treatment and the film was wound up.

The resulting film was 55 microns thick, the core layer being 48.5 micron thick, the chalk-containing layer being 5 microns thick, and the copolymer layer being 1.5 microns thick.

Label-sized pieces of film were then cut from the roll of film and used for in-mold labelling to form margarine tubs, the molding being effected by thermoforming polypropylene sheet 900 microns thick at a temperature of 150° C. into a suitable die. The molded pots were then removed from the die.

The labels formed from the film of the present invention showed uniform whiteness without a leathery appearance.

I claim:

1. A method of in-mold labelling a polymeric article comprising:

placing into a mold a label comprising a biaxially oriented polymeric film comprising a core layer of pigmented, non-voided propylene homopolymer with a layer of voided propylene homopolymer on one surface of the core layer and a printable layer on the other surface of the core layer;

placing molding polymer into the mold; and molding said molding polymer in said mold such that the voided layer of said label contacts and adheres to the molding polymer, thereby producing a labelled, molded polymer article.

2. The method as defined in claim 1, wherein the printable layer of said film is exposed following molding.

3. The method as defined in claim 1, wherein the molding polymer is injected into a mold containing said label.

4. The method of claim 1 wherein the voided layer of the film has a thickness which is up to 20% of the total film thickness.

5. The method of claim 4 wherein the voided layer is 2–10 microns thick.

6. The method of claim 5 wherein the voided layer contains voiding agents in the amount of 2.5% to 15% by weight of the voided layer.

7. The method of claim 6 wherein the amount of voiding agent in the voided layer is 5%–10% by weight of the voided layer.

8. The method of claim 6 wherein the voided layer has a thickness which is less than 15% of the total film thickness.

9. The method of claim 8 wherein the thickness of the voided layer is less than 8% of the total film thickness.

10. The method of claim 1 wherein the voided propylene homopolymer contains an adhesion promoter.

11. The method of claim 10 wherein the adhesion promoter comprises a polymer containing units derived from propylene and at least one of ethylene and 1-butene, and mixtures thereof.

12. The method of claim 1 wherein the voided layer of propylene homopolymer is thinner than the non-voided layer of propylene homopolymer.

13. The method of claim 1 wherein the pigment is selected from the group consisting of titanium dioxide, barium sulphate, zinc sulphide, calcium carbonate, mica and chalk.

14. The method of claim 1 wherein the printable layer comprises a polymer containing units derived from at least two propylene, ethylene and 1-butene.

15. The method of claim 1 wherein the printable layer comprises an acrylic polymer.

16. The method of claim 1 wherein the printable layer has been subjected to a treatment to increase its surface energy.

* * * * *